(No Model.)
T. & W. T. JAMES.
PIPE CONNECTION FOR FLUIDS.
No. 531,615. Patented Dec. 25, 1894.
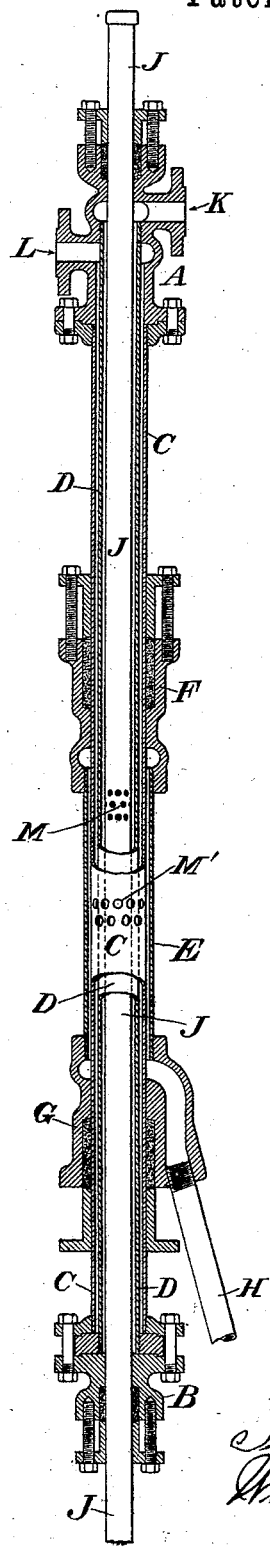
WITNESSES
INVENTORS
Thomas James
William T. James.
THE NORRIS PETERS CO., PHOTO-LITHO., WASHINGTON, D. C.

UNITED STATES PATENT OFFICE.

THOMAS JAMES AND WILLIAM T. JAMES, OF BRADDOCK, PENNSYLVANIA.

PIPE CONNECTION FOR FLUIDS.

SPECIFICATION forming part of Letters Patent No. 531,615, dated December 25, 1894.

Application filed February 10, 1894. Serial No. 499,748. (No model.)

*To all whom it may concern:*

Be it known that we, THOMAS JAMES and WILLIAM T. JAMES, of Braddock, in the county of Allegheny and State of Pennsylvania, have invented a new and useful Improvement in Pipe Connections for Fluids, of which the following is a full, clear, and exact description.

Our invention is designed to provide a system of piping for conducting water, air, steam, or other fluids, in cases where the pipes through which the fluid is conducted are desired to have rotatory axial motion as well as longitudinal telescopic motion, and is applicable especially to use in hydraulic cranes in which it is required that the jib of the crane should have a vertical motion up and down, and also a rotating motion around its center of motion.

In the accompanying drawing, forming part of this specification, we show a vertical section through the system of pipes for conducting water, or other liquid, and which in case of a hydraulic crane is preferably placed upon the center of the mast on which the jib is supported.

In the drawing the parts between A and F, and F and G, are shown shorter in proportion than they will generally be made in practice, and for purposes of better illustration we show portions of the pipes C and D in elevation.

In the drawing, A is the head which is attached to the roof of some stationary part above the crane, and is connected with the lower stuffing-box B by means of two pipes C and D, by means of which the lower stuffing-box is suspended from the head A and sustained by the same support. Sliding on the outer pipe C are two stuffing-boxes F and G, which are connected together by a pipe or sliding section E, which forms a cylinder outside of the pipe C, and affording a fluid connection from the stuffing-box F between the pipes C and E to the outlet-pipe H, which leads to the pneumatic, hydraulic or steam cylinder by which the crane is operated. A center pipe J passes through the system of pipes constituting our improved device, the upper end of the pipe being closed, and the lower end of the pipe communicating with the other end of the cylinder from that with which the pipe H communicates, the pipes J and H thus forming the fluid connections with the operating cylinder or motor of the pneumatic, hydraulic or steam engine. In the upper end of the head A are the passages K and L, which form the adit and exit ports for the fluid by which the motor is operated. In the center pipe J are perforations M, affording communication between the interior of the pipe J and the space between the pipes J and D. Similar perforations M' are made in the pipe C, connecting the space between the pipe C and the connecting sleeve E with the space between the pipes C and D. The pipes J, D, C and connecting sleeve E are parallel to and concentric with each other and with the fluid spaces between them. The stuffing-boxes F and G are connected together by the sleeve E, and both are attached to the mast of the crane, or that part of the mechanism which has a vertical motion and which carries the operating cylinder. It is not necessary, however, that the mast and jib should be connected together, as in some cranes the jib moves independently of the mast, in which case the sleeves F and G will be attached to the jib instead of to the mast so as to preserve the same constant relative position of the pipes H and J with the operating cylinder.

By the construction which we have described, the stuffing-boxes F and G turn upon the pipe C, which is stationary, and is suspended from the head A. They also have a telescopic motion upon the pipe C in a vertical direction, so that the vertical motion of the jib in either direction will not interfere with the passage of the fluids (water, air or steam) to and from the cylinder of the engine. Supposing the pipe-coupling K, in the head A, to be the adit port through which the fluid passes to the cylinder, the fluid traverses the space between the center pipe J and the pipe D until it reaches the perforations M in the pipe J, and having no other passage, as the lower part of the pipe D is closed at the lower stuffing-box B, the fluid passes into the pipe J and thence to one end of the cylinder. In this case, the pipe H forms the exit pipe of the fluid from the cylinder, which passes up through the space between the sleeve E and the pipe C until it reaches the perforations M' in the pipe C, and enters the space between pipes C and D, and thence up to the exit port L. On the reverse motion of the cylinder, the fluid enters the port L, which then becomes the adit, passes down the space between the pipes C and D until it reaches the perforations M' in the pipe C, and enters the space between the pipe C and the connecting sleeve E, and thence to the pipe H, while the exhaust from the cylinder passes up the center pipe J, which is closed at the upper end, and through the perforations M into the space between the pipes J and D, until it reaches the port K.

It will be obvious from the description which we have given that the vertical motion of the sleeves F and G, sliding upon and telescoping with the pipe C, and the circular motion of the stuffing-boxes F and G permit a free relative motion between the cylinder of the engine and the adit and exhaust pipes and of the stationary pipes through which the fluid is introduced to the engines, and avoid the necessity of the use of hose or other flexible pipe for supplying the operative fluid to the cylinder, as has heretofore been found necessary and which has been a source of great trouble and inconvenience.

It will be noticed in the foregoing description that of the pipes which we have described, the pipes J and E are moved telescopically with reference to the other pipes with which they are concentrically arranged, and that these other pipes D and C are not vertically movable. Within the scope of our invention, however, it is possible to reverse these parts, making the pipes J and E fixed, and the pipes C and D longitudinally movable.

We are the first to combine four or more pipes arranged concentrically with reference to each other so as to afford passage of two or more streams of fluid, two of the pipes being vertically movable and rotary, and the others being fixed, with suitable perforations connecting adjacent water passages between the pipes for the purpose of permitting the flow of the water in the desired manner. We are also the first to provide a fluid connection permitting relative longitudinal and rotary motion and comprising passages for at least two streams of fluid through a single center or axis.

We claim—

1. A fluid connection comprising pipes or conduits having a longitudinal and rotary motion relatively to each other and provided with passages for at least two streams of water, and connections from said pipes to a fluid supply or exhaust and to an external motor or motors; substantially as described.

2. A fluid connection for cranes or other rotating and longitudinally movable mechanism, which consists of at least four concentric pipes or conduits, of which two at least are connected by fixed connections to fluid supply or exhaust, while the other two are longitudinally movable and rotary thereon and are connected with a motor or motors to be supplied, said concentric pipes having lateral passages to permit passage of the fluid from the fixed fluid connection to the movable fluid connection, and vice versa; substantially as described.

3. In a fluid connection for cranes or other rotating or longitudinally movable mechanism, the combination of concentric pipes J, D and C, the pipe J being vertically movable, and the outer traveling section E movable with said pipe J, fluid passages connected with the said ports C, D and E, and lateral openings connecting the ports J and D, and C and E respectively; substantially as described.

In testimony whereof we have hereunto set our hands.

THOMAS JAMES.
WILLIAM T. JAMES.

Witnesses:
H. M. CORWIN,
THOMAS W. BAKEWELL.